United States Patent
Boedi et al.

(10) Patent No.: US 6,931,347 B2
(45) Date of Patent: Aug. 16, 2005

(54) SAFETY STOCK DETERMINATION (75) Inventors: Richard A. Boedi, Adiswil (CH);
Abderrahim Labbi, Zurich (CH);
Ulrich B. Schimpel, Nuremberg (DE)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 10/743,249

(22) Filed: Dec. 22, 2003

(65) Prior Publication Data

US 2004/0133403 A1 Jul. 8, 2004

(30) Foreign Application Priority Data

Mar. 29, 2002 (EP) ............................................. 02007436

(51) Int. Cl.$^7$ ............................................. G06F 15/00
(52) U.S. Cl. ........................................ 702/137; 705/28
(58) Field of Search ............................. 702/137; 705/28

(56) References Cited

U.S. PATENT DOCUMENTS 5,287,267 A * 2/1994 Jayaraman et al. ........... 705/10
6,144,495 A * 11/2000 Koch et al. .................. 359/618
6,813,540 B2 * 11/2004 Scotti et al. ................. 700/216

\* cited by examiner

*Primary Examiner*—Bryan Bui
*Assistant Examiner*—Anthony T. Dougherty
(74) *Attorney, Agent, or Firm*—Richard M. Goldman (57) ABSTRACT

The invention is directed to a method for assigning to a set of products a set of corresponding continuous demand densities. In a conversion step for each product its demand time series is converted into a discrete demand density. In a normalization step the discrete demand densities are transformed into normalized discrete demand densities. In a clustering step each of the normalized discrete demand densities is assigned to a cluster and for each cluster a cluster-representative discrete density is determined. In a selection step for each cluster-representative discrete density out of a predetermined set of continuous model densities a cluster-representative continuous density is selected. In a parameter-determination step for each product for its cluster-representative continuous density product-individual density parameters are determined under use of which for each product a continuous density is determined. In an adjustment step for each product the continuous density is adjusted into the continuous demand density.

15 Claims, 2 Drawing Sheets

SAFETY STOCK DETERMINATION

The invention relates to a method for assigning to a set of products a set of corresponding continuous densities of demand distributions. More particularly it relates to a method for determining safety stock levels for several products and for controlling the corresponding stock level.

TECHNICAL FIELD AND BACKGROUND OF THE INVENTION

Warehouses are used as stock supply of on-sale items because of uncertainties of demand or because some suppliers only deliver large lot sizes. Apart from figuring out what product has to be ordered when and at what quantity, one of the most important problems in warehousing is to set the size of the safety stock correctly. The safety stock is supposed to cover the uncertainty of demand during the inbound lead time. If the safety stock level is too high then more financial resources are bound to the inventory than necessary. If, however, the safety stock level is too low, the supplier will more often run into out-of-stock situations and thus will not be able to satisfy the demand and thereby fail to meet the desired serviceability.

Most of the software tools used in supply chain management and warehousing determine the level of safety stock for each of the products under the assumption that the daily demands are normally distributed or by simply setting a fixed safety stock level. However, the problem with this assumption is that in many cases the demand is far from being normally distributed. In particular, this is true for certain kinds of warehouses like for spare parts. In the end this results in incorrectly calculated safety stock levels, i.e. either the achieved service levels end up being too high and therefore the inventory level could have been reduced or the achieved service levels end up being too low, thereby failing to meet the desired serviceability. In both cases additional costs are generated.

From Kohonen, Teuvo: "Self-Organizing Maps", 3rd edition, Springer Ser. in Information Sciences 30, Berlin 2001, a clustering algorithm is known. Additional information thereto can be found in Kohonen, Teuvo, "The self-organizing map", Neurocomputing 21, No. 1–3, 1–6 (1998).

In Kullback, Leibler: "On Information and Sufficiency", in Annals of Mathematical Statistics 22 (1951), pp 79–76, the Kullback-Leibler distance is described.

In Scarf, "The Optimality of (s,S) Policies in the Dynamic Inventory Problem", in Arrow, Suppes (Ed.), Mathematical Methods in the Social Science", Stanford University Press, Stanford 1960" the (s,S) replenishment method is described. More about that can be found in Zheng, Y.-S. "A simple Proof for the Optimality of (s,S) Policies in Infinite Horizon Inventory Systems", Journal of Applied Probability 28, 802–810 (1991)

In Schneider, H., "Effect of Service-Levels on Order-Points or Order-Levels in Inventory Models", International Journal of Productions Research 19, 615–631 (1981) service level definitions are described.

OBJECT AND ADVANTAGES OF THE INVENTION

According to an aspect of the invention as set forth in the claims a method for assigning to a set of products a set of corresponding continuous densities of demand distribution is provided.

The proposed method has the advantage of offering a safety stock level with higher precision, i.e. offering a product stock controller a means to get closer to his target to minimize the overall safety stock value under the condition of maintaining a given service level. The precision is particularly achieved utilizing a clustering step that on one hand reduces the number of determinations in a subsequent selection step and that on the other hand is able to introduce a cross-product statistical data enhancement effect, i.e. improve the demand statistics especially for sporadically demanded products. This allows to use more density models in the selection step and thereby achieve better precision in that step. Using the same number of density models for direct comparison with the products' densities would lead to an excessive uneconomic determination workload.

According to another aspect of the invention a method is provided that further encompasses a safety stock determination wherein with a given service level from the continuous demand densities a product safety stock level is determined.

According to yet another aspect of the invention the method can be enhanced by a product order step wherein via an output device an order for a product is initiated towards a product-providing entity, e.g. via a communication medium like a communication network, in the event that a stock level of that product falls below a reorder point. Thereby an automated product stock control is achievable.

The method can further comprise a clustering correction step wherein for each product a distance between its continuous density and its normalized discrete demand density, is determined and wherein for those of said products whose distance exceeds a predetermined threshold value, in a substitute-selection step for the corresponding normalized discrete demand density out of said predetermined set of continuous model densities a substitute continuous density is selected, which is defined for that product as its continuous density. That cluster correction step is advantageous because it is able to perform a distance check between the determined continuous densities and the normalized discrete demand densities and perform a correction should the distance be found too large. This improves the precision of the resulting assigned continuous densities and thereby reduces the error in the final safety stock levels.

In the conversion step the demand time series can be substantially segregated from demand trend and periodic demand. Segregating the demand time series from demand trend and periodic demand is another way of increasing precision, since the parts that are removed would lead to errors in the resulting assigned continuous densities and hence in the final safety stock levels.

In the normalization step normalization information can be maintained for the adjustment step. Maintaining the normalization information for the adjustment step facilitates the method since that information can be directly used there and need not be constructed in a different manner.

If for each of the clusters an initial cluster representative is provided, and if the clustering step comprises for each of the normalized discrete demand densities a distance determination step wherein for each said initial cluster representative its distance from the normalized discrete demand density is determined, and a modification step wherein the one initial cluster representative is modified towards the normalized discrete demand density to which it has the smallest distance, said modified cluster representative being thereafter defined as new initial cluster representative. Using a difference estimation step and a modification step in the clustering step provides advantageous because this method is a quick and precise way of clustering. Furthermore the Kohonen algorithm can be utilized therefor.

If the distance determination step and the modification step are repeated one or more times for each of the normalized discrete demand densities, starting with the initial cluster representatives that are present after the previous last modification step, this provides the advantage that the clustering result will be preciser which again leads to less errors in the resulting assigned continuous densities and hence in the final safety stock levels.

Selecting the initial cluster representatives that are present after the last modification step in the clustering step as the cluster-representative discrete density brings the advantage that since the initial cluster representatives are already present, no additional steps for the selection have to be performed. This hence reduces the time the method takes.

If in the clustering step a said cluster representative is substantially not modified when its distance to those normalized discrete demand densities that belong to the corresponding cluster is below a predetermined value, unnecessary representative movements are avoided, which on one hand reduces the clustering time and on the other hand avoids an exacerbation of the resulting clusters. Adding a condition that this cluster need have a number of thereto-belonging demand densities, also called members, that is bigger than a predetermined number, would introduce the advantage that only clusters of a predetermined minimum size are handled this way, again improving the clustering result.

If the predetermined set of continuous model densities contains the model densities with its parameters in an undetermined form and the parameters for the clusters, are determined in the selection step, this brings in the advantage that the selection step becomes less storage-intensive since less model densities need be stored.

If in the normalization step the demand value for 0 pieces of the products in the discrete demand densities is rescaled inversely to the demand values for more than 0 pieces of the same product, a preciser clustering for products with sporadic demand, also referred to as slow-moving items, is the advantageous result.

If in the selection step the demand value for 0 pieces of the products is suppressed, the selection result is less distorted by that demand value, which improves the resulting selection.

If the method further comprises a safety stock determination step wherein with a given service level from the continuous demand density for one or more of the products a product safety stock level is determined, a stock controller gets preciser information about how many pieces of the product should be kept on stock in order to guarantee the service level.

Performing a product order step wherein via an output device an order for a said product is initiated towards a product-providing entity, in the event that a current stock level, of that product falls below a minimum quantity that is the sum of the average of the discrete demand density for said product during the product's lead time, and the determined safety stock level for said product provides advantageous since it realizes an automated stock control for the products, thereby decreasing the probability of out-of-stock situations.

The above methods are implementable in form of program code means for performing the method.

SUMMARY OF THE INVENTION

The invention is directed to a method for assigning to a set of products a set of corresponding continuous demand densities. In a conversion step for each product its demand time series is converted into a discrete demand density. In a normalization step the discrete demand densities are transformed into normalized discrete demand densities. In a clustering step each of the normalized discrete demand densities is assigned to a cluster and for each cluster a cluster-representative discrete density is determined. In a selection step for each cluster-representative discrete density out of a predetermined set of continuous model densities a cluster-representative continuous density is selected. In a parameter-determination step for each product for its cluster-representative continuous density product-individual density parameters are determined under use of which for each product a continuous density is determined. In an adjustment step for each product the continuous density is adjusted to form therefrom the continuous demand density.

DESCRIPTION OF THE DRAWINGS

Examples of the invention are depicted in the drawings and described in detail below by way of example. It is shown in FIG. 1 a block diagram, specifying the different steps and results of a density assignment process.

All the figures are for sake of clarity not shown in real dimensions, nor are the relations between the dimensions shown in a realistic scale.

DETAILED DESCRIPTION OF PREFERRED EMBODIMENTS

In the following, the various exemplary embodiments of the invention are described.

For sake of simplicity, in the following, when referring to a "density", the density of the demand distribution is meant. When the index "i" is used herein for a specific reference indicator this is meant as a variable that could take any value of the specific values used elsewhere in this description for the same reference indicator.

Figure 1:
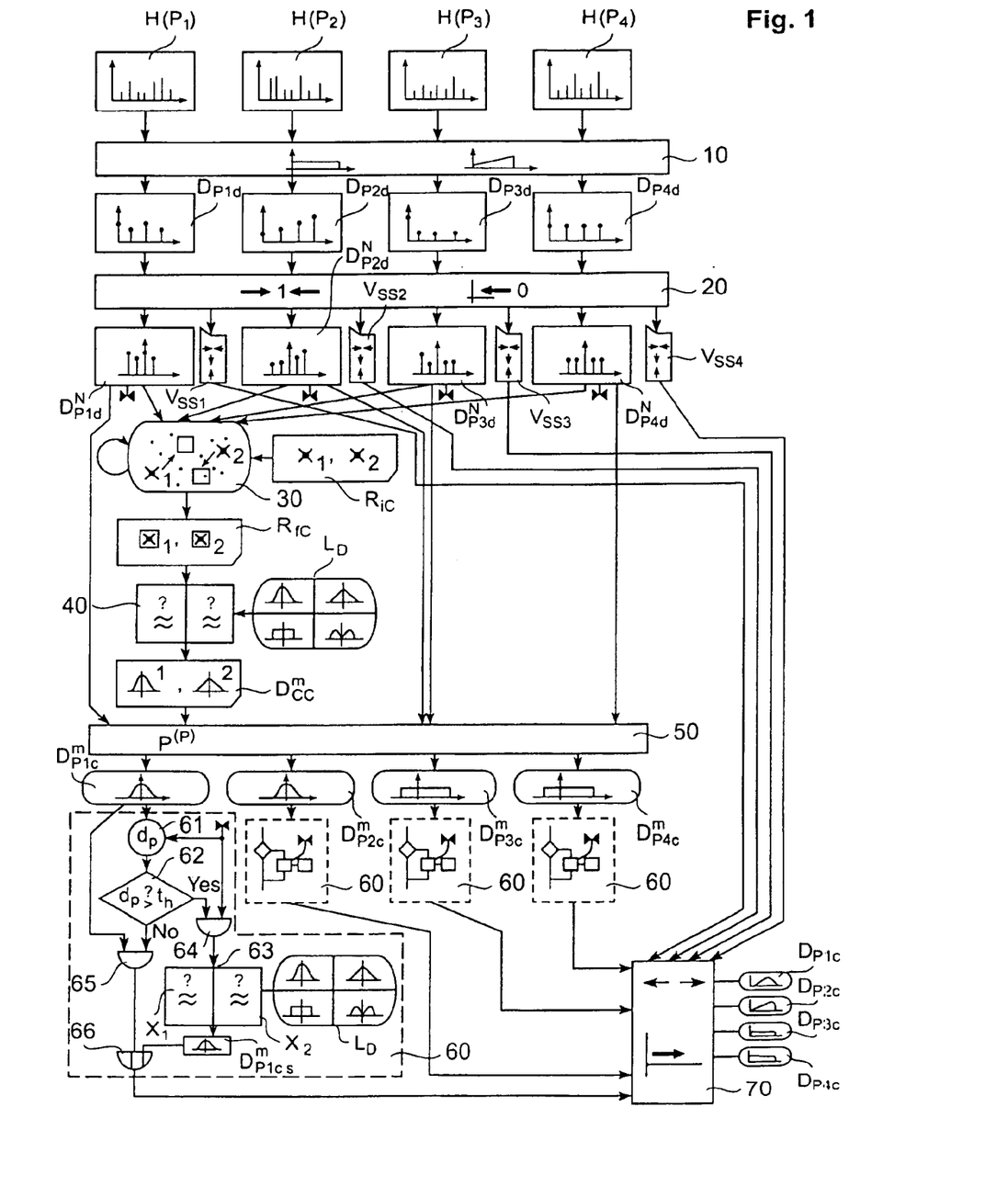

In FIG. 1 a block diagram, specifying the different steps and results of a density assignment process is shown.

For each of a multitude of products $P_1$, $P_2$, $P_3$, $P_4$, a corresponding demand time series $H(P_1)$, $H(P_2)$, $H(P_3)$, $H(P_4)$ is given. The demand time series can be a historical demand data, e.g. the demand development for the respective product $P_1$, $P_2$, $P_3$, $P_4$ watched over a specific period of time. The time is herein quantified into time units, e.g. days. The demand is herein quantified into demand units, i.e. the smallest measured demand unit, to allow comparison of different product types. E.g. for screws a package of 1000 pieces can be regarded as smallest traded and demanded unit, whereas for orange juice, 1 liter will be regarded as smallest traded and demanded unit. These demand units will in the following be referred to as demand quantities.

In a conversion step 10 for each product $P_1$, $P_2$, $P_3$, $P_4$ its demand time series $H(P_1)$, $H(P_2)$, $H(P_3)$, $H(P_4)$ is converted into a corresponding discrete demand density $D_{P1d}$, $D_{P2d}$, $D_{P3d}$, $D_{P4d}$ by a binning process that defines a finite set of demand bins into which the actual demands are put. Such a bin could e.g. provide for a demand from 1 to 5 pieces belonging into a first bin, 6 to 10 pieces belonging to a second bin, a.s.o. Each of these discrete demand densities $D_{P1d}$, $D_{P2d}$, $D_{P3d}$, $D_{P4d}$ hence shows for its corresponding product $P_1$, $P_2$, $P_3$, $P_4$, how often a specific amount of that product $P_1$, $P_2$, $P_3$, $P_4$ is demanded. This discrete demand density $D_{P1d}$, $D_{P2d}$, $D_{P3d}$, $D_{P4d}$ is free from demand trend and periodic demand. The purging can be done in the conversion step 10, but can also be done before, i.e. the demand time series $H(P_1)$, $H(P_2)$, $H(P_3)$, $H(P_4)$ can also be already provided in a form that is free from demand trends and periodicities. "Free" herein means substantially free, since the purging in reality can not guarantee a 100% removal of trend and periodicity. Thus in the discrete demand density $D_{P1d}$, $D_{P2d}$, $D_{P3d}$, $D_{P4d}$ substantially the stochastical component remains. Since demand trend and periodic demand are those demand components that can be more easily predicted, the safety stock need not cover it. The remaining, stochastical component is hence the one for which the safety stock is provided for the corresponding product $P_1$, $P_2$, $P_3$, $P_4$.

As next step follows a normalization step 20 wherein the discrete demand densities $D_{P1d}$, $D_{P2d}$, $D_{P3d}$, $D_{P4d}$ are transformed into normalized discrete demand densities $D^N_{P1d}$, $D^N_{P2d}$, $D^N_{P3d}$, $D^N_{P4d}$. The normalization provides for a scaling to a norm value for the average and a norm value for the variance. The typical norm value for the average is 0 and the typical norm value for the variance is 1. The normalization to the norm value for the average effects a shifting by a shifting-factor $s_a$, whereas the normalization to the norm value for the variance effects a scaling by a scaling-factor $s_v$. These two factors $s_a$, $s_v$ can be maintained for each normalized discrete demand density $D^N_{P1d}$, $D^N_{P2d}$, $D^N_{P3d}$, $D^N_{P4d}$, respectively the corresponding product $P_1$, $P_2$, $P_3$, $P_4$, as adjustment factor set $v_{ss1}$, $v_{ss2}$, $v_{ss3}$, $v_{ss4}$ for a later adjustment step 70. The normalization has the effect that in the subsequent step, the densities $D^N_{P1d}$, $D^N_{P2d}$, $D^N_{P3d}$, $D^N_{P4d}$, that are compared have a common scale which effects a preciser relative positioning of the densities $D^N_{P1d}$, $D^N_{P2d}$, $D^N_{P3d}$, $D^N_{P4d}$, with respect to each other. More precisely, the distances $d_C(X_i, D^N_{Pid})$, as explained below, will be more accurate which leads to a fairer clustering, i.e. those densities $D^N_{P1d}$, $D^N_{P2d}$, $D^N_{P3d}$, $D^N_{P4d}$, which have the same shape will eventually be assigned to the same cluster.

As next step follows a clustering step 30 wherein each of the normalized discrete demand densities $D^N_{P1d}$, $D^N_{P2d}$, $D^N_{P3d}$, $D^N_{P4d}$ is assigned to a cluster $C_1$, $C_2$ and wherein for each cluster $C_1$, $C_2$ a cluster-representative is determined which is a cluster-representative discrete density $R_{fC}$. The number of clusters $C_1$, $C_2$ is predefined and can be determinable for this method.

The clustering step 30 comprises for each of the normalized discrete demand densities $D^N_{P1d}$, $D^N_{P2d}$, $D^N_{P3d}$, $D^N_{P4d}$ two steps, a distance determination step and a modification step. First for each of the clusters $C_1$, $C_2$ an initial cluster representative $R_{ic}$, also referred to as initial cluster representative $X_1$, $X_2$, is provided. The initial cluster representative $X_1$, $X_2$ need not be a normalized density since in the subsequent steps the quality of being normalized does not play a role. Normalization is here only of value for the relative positions of the discrete demand densities $D^N_{P1d}$, $D^N_{P2d}$, $D^N_{P3d}$, $D^N_{P4d}$.

In the distance determination step, for all initial cluster representatives $X_1$, $X_2$ their distance $d_C(X_i, D^N_{Pid})$ from one of the normalized discrete demand densities $D^N_{P1d}$, $D^N_{P2d}$, $D^N_{P3d}$, $D^N_{P4d}$ is determined. The one normalized discrete demand density $D^N_{P1d}$, $D^N_{P2d}$, $D^N_{P3d}$, $D^N_{P4d}$ can be selected according to any selection mechanism, be it a simple sequential scheme, or a random selection.

As distance herein the Kullback-Leibler distance can be used, by defining each cluster representative $X_1$, $X_2$ and each normalized discrete demand density $D^N_{P1d}$, $D^N_{P2d}$, $D^N_{P3d}$, $D^N_{P4d}$ as a point in an n-dimensional Kullback-Leibler space, wherein n is the number of quantity bins used in the conversion step 10. The position of the normalized discrete demand densities $D^N_{P1d}$, $D^N_{P2d}$, $D^N_{P3d}$, $D^N_{P4d}$ in the Kullback-Leibler space depends on their average and variance, which due to the normalization step 20 has been unified, thereby leading to a common determination basis and a correct relative positioning within the Kullback-Leibler space. The positive effect of the normalization step 20 is present for any type of clustering involving distance-determination.

The start position of the initial cluster representatives $X_1$, $X_2$ can be preselected, but it is found that performing a number of iterations, as is described below, the start position becomes practically irrelevant. Therfore a start position of the initial cluster representatives $X_1$, $X_2$ can be selected, that is independent from the type, number or density of the products $P_1$, $P_2$, $P_3$, $P_4$. The method can be designed to renounce a possibility to determine start positions and thereby require less user interaction by a stock controller.

Next follows a modification step. In this step among the found distances $d_C(X_i, D^N_{Pid})$ the smallest distance and the corresponding pair of initial cluster representative $X_i$ and normalized discrete demand density $D^N_{Pid}$ is determined. Then that initial cluster representative $X_i$ is moved, i.e. modified, towards that normalized discrete demand density $D^N_{Pid}$, if the distance $d_C(X_i, D^N_{Pid})$ is not already below a predetermined maximum distance level, e.g. 0. The Kohonen clustering algorithm can be used to perform that function, wherein the cluster representatives $X_i$ will be what in the Kohonen algorithm is referred to as centers.

The distance determination step and the modification step are performed for each of the normalized discrete demand densities $D^N_{P1d}$, $D^N_{P2d}$, $D^N_{P3d}$, $D^N_{P4d}$. In the case of only a single run of the distance determination step and the modification step, it is useful to guarantee that every normalized discrete demand density $D^N_{P1d}$, $D^N_{P2d}$, $D^N_{P3d}$, $D^N_{P4d}$ is once handled this way. In case of multiple iterations, a random selection is deemed to satisfy this criterion by effect of its statistical uniform distribution. In that case, a tracking of the use of each normalized discrete demand density $D^N_{P1d}$, $D^N_{P2d}$, $D^N_{P3d}$, $D^N_{P4d}$ is not necessary.

The clustering step 30 hence has the effect that the clusters $C_1$, $C_2$ and their representatives $X_1$, $X_2$ are defined and that furthermore it is defined which of the normalized discrete demand densities $D^N_{P1d}$, $D^N_{P2d}$, $D^N_{P3d}$, $D^N_{P4d}$ belongs to which of the clusters $C_1$, $C_2$.

The clustering step 30 can be repeated in that in the distance determination step for each modified cluster representative $X_1$, $X_2$ its distance $d_C(X_i, D^N_{Pid})$ from the normalized discrete demand densities $D^N_{P1d}$, $D^N_{P2d}$, $D^N_{P3d}$, $D^N_{P4d}$ is determined, and in the modification step each modified cluster representative $X_1$, $X_2$ is modified towards the normalized discrete demand density $D^N_{P1d}$, $D^N_{P2d}$, $D^N_{P3d}$, $D^N_{P4d}$ to which its distance $d_C(X_i, D^N_{Pid})$ is smallest. This repetition, also called iteration, can be done several times, referred to as epoque in the Kohonen algorithm. Thereby the accuracy of the clustering step 30 is increased. This means that the final clusters $C_1$, $C_2$ are more precisely defined, meaning that the modified cluster representatives $X_1$, $X_2$ lie in a closer distance to the normalized discrete demand density $D^N_{P1d}$, $D^N_{P2d}$, $D^N_{P3d}$, $D^N_{P4d}$ that belong to its cluster $C_1$, $C_2$.

It has been found that irrespective of the number of products $P_1$, $P_2$, $P_3$, $P_4$ and even irregard of the density types thereof, a number of between 30 and 50 iterations are sufficient to achieve a sufficient stability. Generally it can hence be stated that it is advantageous to perform more than 30 iterations. Since with the number of iterations the execution time rises, it can also be stated that less than 50 iterations are advantageous. As stability criterion the average distance $d_C(X_i, D^N{}_{Pid})$ between the modified cluster representatives $X_1$, $X_2$ and the normalized discrete demand density $D^N{}_{P1d}$, $D^N{}_{P2d}$, $D^N{}_{P3d}$, $D^N{}_{P4d}$ that belong to the respective cluster $C_1$, $C_2$, can be used. Also an automatism can be used that stops performing further iterations if a certain stability of the sample locations has been reached, i.e. the average distance $d_C(X_i, D^N{}_{Pid})$ has fallen below a predetermined maximum distance value.

The distance determination step can be executed under use of different distance determinators, thereby providing several values for the distances $d_C(X_i, D^N{}_{Pid})$. In such a case the modification step is executed using the smallest value of the distance $d_C(X_i, D^N{}_{Pid})$. The use of different distance determinators allows to avoid situations in which the distance $d_C(X_i, D^N{}_{Pid})$ that is calculated and determined does not correctly reflect the true relation between the modified cluster representative $X_1$, $X_2$ and the normalized discrete demand densities $D^N{}_{P1d}$, $D^N{}_{P2d}$, $D^N{}_{P3d}$, $D^N{}_{P4d}$. The different distance determinators typically perform different distance-determination algorithms that hence also result in different values for the distances $d_C(X_i, D^N{}_{Pid})$. It is assumable that the distance determinator with the smallest value of the distance $d_C(X_i, D^N{}_{Pid})$ is the most accurate and useful. The term "distance" is to be understood as a metric in the mathematical sense.

Finally a cluster-representative discrete density $R_{fC}$ is determined for each cluster $C_1$, $C_2$. The simplest selection is to select the modified cluster representatives $X_1$, $X_2$ that exist after the last modification step as the cluster-representative discrete density $R_{fC}$. This selection has the advantage that no additional algorithm for selecting the cluster-representative discrete density $R_{fC}$ has to be performed. It is also assumable that after running through the modification step, in particular after several iterations, the modified cluster representatives $X_1$, $X_2$ are the best possible choice for the cluster-representative discrete density $R_{fC}$. Since the cluster-representative discrete density $R_{fC}$ is only used for a calculation step, it need not be any of the normalized discrete demand densities $D^N{}_{P1d}$, $D^N{}_{P2d}$, $D^N{}_{P3d}$, $D^N{}_{P4d}$. The clustering step 30 has a very valuable advantage in that by the clustering products $P_1$, $P_2$, $P_3$, $P_4$ are grouped that not necessarily have any correlation to each other. In particular this means that those products $P_1$, $P_2$, $P_3$, $P_4$ which have only few demand occurrences in the period of time used for the demand time series $H(P_1)$, $H(P_2)$, $H(P_3)$, $H(P_4)$, in the following referred to as slow-moving items, profit from those products $P_1$, $P_2$, $P_3$, $P_4$ that have a similar normalized discrete demand density $D^N{}_{P1d}$, $D^N{}_{P2d}$, $D^N{}_{P3d}$, $D^N{}_{P4d}$, but which have a higher number of demand occurrences in the same period of time. This increases the accuracy of the subsequent selection step 40 for the products $P_1$, $P_2$, $P_3$, $P_4$ with only few demand occurrences.

The purpose of clustering the data is hence twofold. First, it enhances the quality of the succeeding steps by enlarging the amount of data that is being analyzed. This is especially true for slow-moving items because those have only little statistical data and the clustering effects the use of statistical data of all products $P_1$, $P_2$, $P_3$, $P_4$ in that cluster. Second, the subsequent steps need only be performed on the cluster's representatives $X_1$, $X_2$.

The clustering step 30 can be further improved by introducing an exceptional rule: In the clustering step 30, the cluster representative $X_1$, $X_2$ is substantially not modified when its distance $d_C(X_i, P_j)$ to the normalized discrete demand densities $D^N{}_{P1d}$, $D^N{}_{P2d}$, $D^N{}_{P3d}$, $D^N{}_{P4d}$ that belong its cluster $C_1$, $C_2$, is below a predetermined distance value. By giving the distance value for the distance $d_C(X_i, D^N{}_{Pid})$, being a maximum value, a cluster representative $X_1$, $X_2$ is substantially prevented from being moved away from these normalized discrete demand densities $D^N{}_{P1d}$, $D^N{}_{P2d}$, $D^N{}_{P3d}$, $D^N{}_{P4d}$, to which it is so close. This reflects the idea that in the case one of the cluster representatives $X_1$, $X_2$ is very close, i.e. the distance $d_C(X_i, D^N{}_{Pid})$ being below the predetermined distance value, to the corresponding normalized discrete demand densities $D^N{}_{P1d}$, $D^N{}_{P2d}$, $D^N{}_{P3d}$, $D^N{}_{P4d}$, then the cluster representative $X_i$ is to be regarded as a good representative and hence shall not be modified, i.e. not by some effect of the clustering step 30 be moved away from its good position. This cluster representative $X_1$, $X_2$ is practically frozen to its position, avoiding unwanted exacerbation of its position and even reducing the determination time in the modification step. Additionally the condition that the cluster $C_1$, $C_2$ should have a minimum size, i.e. a minimum number of thereto-belonging normalized discrete demand densities $D^N{}_{P1d}$, $D^N{}_{P2d}$, $D^N{}_{P3d}$, $D^N{}_{P4d}$, may be added, to ensure that the cluster freezing is only performed for clusters $C_1$, $C_2$ of significant size.

As next step follows a selection step 40 wherein for each cluster-representative discrete density $R_{fC}$ out of a predetermined set $L_D$ of continuous model densities $D^m{}_{Mc}$ a cluster-representative continuous density $D^m{}_{Cc}$ is selected. This is hence the step that goes from the discrete densities to the continuous densities. The task is to find among the continuous model densities $D^m{}_{Mc}$ one that fits best the respective cluster-representative discrete density $R_{fC}$. The set $L_D$ should comprise model densities of different basic types like Gauss, Gamma, Poisson, Weibull, Logistic, and other parametrized density families.

The predetermined set $L_D$ of continuous model densities $D^m{}_{Mc}$ here contains the model densities $D^m{}_{Mc}$ with their parameters p in an undetermined form. This has the advantage that the set need not contain the model densities $D^m{}_{Mc}$ in a lot of possible parametrically determined forms which would unnecessarily increase the need for storage and determination time for going through all of them. Instead, in the selection step 40, the mere shape of the model densities $D^m{}_{Mc}$ is compared to the cluster-representative discrete density $R_{fC}$ to identify a best fit. An algorithm suitable for this operation would be the method of moments or Maximum Likelihood Estimators (MLE). In the course of the selection step 40 it is possible to have some of the parameters p of the model densities $D^m{}_{Mc}$ already determined once they are selected for each cluster-representative discrete density $R_{fC}$. This is in particular useful for shape parameters.

After the selection step 40 follows a parameter-determination step 50 wherein for each product $P_1$, $P_2$, $P_3$, $P_4$ for its cluster-representative continuous density $D^m{}_{Cc}$ product-individual density parameters $p(P_i)$ are determined under use of which for each product $P_1$, $P_2$, $P_3$, $P_4$ a continuous density $D^m{}_{P1c}$, $D^m{}_{P2c}$, $D^m{}_{P3c}$, $D^m{}_{P4c}$ is determined. This step hence leads back from the clusterwise handling to the productwise handling.

The cluster-representative continuous density $D^m{}_{Cc}$ that has been determined for each cluster $C_1$, $C_2$ is now for each product $P_1$, $P_2$, $P_3$, $P_4$ that belongs to the respective cluster $C_1$, $C_2$ compared to the corresponding normalized discrete demand density $D^N{}_{P1d}$, $D^N{}_{P2d}$, $D^N{}_{P3d}$, $D^N{}_{P4d}$ and by means of that comparison the product-individual density parameters $p(P_i)$ for that product $P_1$, $P_2$, $P_3$, $P_4$ are determined. This leads to the continuous density $D^m_{P1c}$, $D^m_{P2c}$, $D^m_{P3c}$, $D^m_{P4c}$ for each product $P_1$, $P_2$, $P_3$, $P_4$. It is possible to use the already determined parameters p, should those already have been determined in the selection step 40.

At this point in the method the continuous densities $D^m_{P1c}$, $D^m_{P2c}$, $D^m_{P3c}$, $D^m_{P4c}$ for each product $P_1$, $P_2$, $P_3$, $P_4$ have been determined. On the basis of those densities $D^m_{P1c}$, $D^m_{P2c}$, $D^m_{P3c}$, $D^m_{P4c}$ the safety stock level $s_i$ for all the products $P_1$, $P_2$, $P_3$, $P_4$ can be determined. It is however possible that due to algorithmic uncertainties, the found continuous density $D^m_{P1c}$, $D^m_{P2c}$, $D^m_{P3c}$, $D^m_{P4c}$ does not accurately enough reflect the normalized discrete demand density $D^N_{P1d}$, $D^N_{P2d}$, $D^N_{P3d}$, $D^N_{P4d}$. A typical case in which this could happen is one where a final distance $d_C(X_i, D^N_{Pid})$ between the cluster representative $X_1$, $X_2$ and a normalized discrete demand density $D^N_{P1d}$, $D^N_{P2d}$, $D^N_{P3d}$, $D^N_{P4d}$ that is in the clustering step 30 determined to be a member of the corresponding cluster $C_1$, $C_2$, is relatively large. A typical scenario for the clustering step 30 is to perform the determination of the distance $d_C(X_i, D^N_{Pid})$ according to a random pairing selection, meaning selecting from all normalized discrete demand densities $D^N_{P1d}$, $D^N_{P2d}$, $D^N_{P3d}$, $D^N_{P4d}$ one after the other at random. Depending on the randomizing algorithm and also on the number of iterations, situations can occur in which the above described effect of a large final distance $d_C(X_i, D^N_{Pid})$ may be present. This large final distance $d_C(X_i, D^N_{Pid})$ would eventually lead to an undesired distance between the found continuous density $D^m_{P1c}$, $D^m_{P2c}$, $D^m_{P3c}$, $D^m_{P4c}$ and the normalized discrete demand density $D^N_{P1d}$, $D^N_{P2d}$, $D^N_{P3d}$, $D^N_{P4d}$.

A clustering correction step 60 can be used to reduce this problem. For each product $P_1$, $P_2$, $P_3$, $P_4$ a distance $d_p$ between its continuous density $D^m_{P1c}$, $D^m_{P2c}$, $D^m_{P3c}$, $D^m_{P4c}$ and its normalized discrete demand density $D^N_{P1d}$, $D^N_{P2d}$, $D^N_{P3d}$, $D^N_{P4d}$, is determined. This is done in a threshold test step 62. For those of the products $P_1$, $P_2$, $P_3$, $P_4$ whose distance $d_p$ exceeds a predetermined threshold value $t_h$, a substitute-selection step 63 is performed. On the condition that the threshold value $t_h$ is exceeded, the normalized discrete demand density $D^N_{P1d}$, $D^N_{P2d}$, $D^N_{P3d}$, $D^N_{P4d}$ is enabled, depicted in form of a logical AND-function 64, as input to the substitute-selection step 63.

In the substitute-selection step 63 for the corresponding normalized discrete demand density $D^N_{P1d}$, $D^N_{P2d}$, $D^N_{P3d}$, $D^N_{P4d}$ out of the predetermined set $L_D$ of continuous model densities $D^m_{Mc}$ a substitute continuous density $D^m_{P1cS}$, $D^m_{P2cS}$, $D^m_{P3cS}$, $D^m_{P4cS}$ is selected, which is defined for that product $P_1$, $P_2$, $P_3$, $P_4$ as its continuous density $D^m_{P1c}$, $D^m_{P2c}$, $D^m_{P3c}$, $D^m_{P4c}$. With other words, instead of using the cluster-representative discrete density $R_{fC}$ as input to the selection step 40, the selection step 40 is again performed using now as input the normalized discrete demand density $D^N_{P1d}$, $D^N_{P2d}$, $D^N_{P3d}$, $D^N_{P4d}$ itself. The found normalized substitute continuous density $D^m_{P1cS}$, $D^m_{P2cS}$, $D^m_{P3cS}$, $D^m_{P4cS}$ is used as a substitute, depicted in form of a logical OR-function 66 in FIG. 1, for the continuous density $D^m_{P1c}$, $D^m_{P2c}$, $D^m_{P3c}$, $D^m_{P4c}$, that is only enabled, depicted in form of a logical AND-function 65 in FIG. 1, to be used if the threshold test step 62 resulted in the finding that the threshold value $t_h$ is not exceeded.

Once the continuous densities $D^m_{P1c}$, $D^m_{P2c}$, $D^m_{P3c}$, $D^m_{P4c}$ have been determined, an adjustment step 70 follows, wherein for each product $P_1$, $P_2$, $P_3$, $P_4$ the continuous density $D^m_{P1c}$, $D^m_{P2c}$, $D^m_{P3c}$, $D^m_{P4c}$ is adjusted into the continuous demand density $D_{P1c}$, $D_{P2c}$, $D_{P3c}$, $D_{P4c}$ such that the continuous demand density $D_{P1c}$, $D_{P2c}$, $D_{P3c}$, $D_{P4c}$ and the discrete demand densities $D_{P1d}$, $D_{P2d}$, $D_{P3d}$, $D_{P4d}$, respectively, have substantially the same average and the same variance. Therefor the factors $s_a$, $s_v$ from the normalization step 20 are used, more precisely, the adjustment factor set $v_{ss1}$, $v_{ss2}$, $v_{ss3}$, $v_{ss4}$ are used. The effect is hence a reshifting and rescaling.

Thereafter for each product $P_1$, $P_2$, $P_3$, $P_4$ the corresponding continuous demand density $D_{P1c}$, $D_{P2c}$, $D_{P3c}$, $D_{P4c}$ has been determined. These continuous demand densities $D_{P1c}$, $D_{P2c}$, $D_{P3c}$, $D_{P4c}$ can be used for determining a corresponding safety stock level $s_i$ for each of the products $P_1$, $P_2$, $P_3$, $P_4$ in a safety stock determination step. In addition herefor, a given service level SL, that here is an $\alpha_1$-service level, is used.

A possible formula for determining the safety stock level $s_i$ is the following:

$$SL(P_i, s_i) = \sum_{k=1}^{LT} \Delta_{Pic}\left(\frac{s_i}{\sqrt{k}} + \mu \frac{LT}{k}\right) p_k + p_0$$

with $$\Delta_{Pic}(x) = \int_{-\infty}^{x} D_{Pic}(t) dt$$

with the lead time LT for the specific product $P_i$ and the average $\mu$ of the continuous demand density $D_{Pic}$ of that product $P_i$, the probability $p_0$ of demand of 0 pieces of that product $P_i$ being demanded during the lead time LT, and the probability $p_k$ that on a number of k days, or more generally time units used in the demand time series $H(P_1)$, $H(P_2)$, $H(P_3)$, $H(P_4)$, more than 0 pieces of that product $P_i$ are being demanded during the lead time LT.

Generally speaking, the continuous demand density $D_{Pic}$ determines for the specific product $P_i$ the relation between the given service level SL of that product $P_i$ and its safety stock level $s_i$. Having in addition for that specific product $P_i$ the corresponding lead time LT, which is the time that passes between placing an order for for that product $P_i$ to a product provider and the factual delivery of the product $P_i$ to the ordering entity, the minimum quantity $Q_m$ of the product $P_i$ in order to be able to guarantee the given service level SL can be determined. The minimum quantity $Q_m(P_i)$ is then given by the sum of the average demand for that product $P_i$ during the lead time LT and the determined safety stock level $s_i$ for that product $P_i$. This also means that as soon as the current stock level $S(P_i)$ for this product $P_i$ falls below or reaches that minimum quantity $Q_m$, a reordering should be initiated. This is called the reorder point. The reordering will then guarantee that the product's current stock level $S(P_i)$ will not be too low. A reordering quantity $Q_r(P_i)$ should be typically higher than the minimum quantity $Q_m$ such that the reorder process and possible associated reorder costs can be held low. Since the reordering quantity $Q_r(P_i)$ depends on associated costs such as reordering costs, warehousing costs, depreciation, etc., it can be put at the discretion of the stock controller to determine the appropriate reordering quantity $Q_r(P_i)$. For the automatic reordering, therefore the system would be provided by the stock controller with the desired reordering quantity $Q_r(P_i)$. However, it is also possible to have the reordering quantity $Q_r(P_i)$ predetermined to enable an automatic reordering process without external intervention.

There are various possible definitions of service level SL, and herein the service level SL is defined as the percentage of cycle times without any occurrence of a stock-out condition, i.e. the inability to satisfy an occurring demand for a product $P_i$ on stock. A replenishment policy can be applied that triggers or initiates a product order as soon as the current stock level $S(P_i)$ thereof drops to or below the minimum quantity $Q_m$.

Hence, once having determined the safety stock level $s_i$, a product order step can be performed wherein via an output device an order to a product $P_1, P_2, P_3, P_4$ is initiated towards a product-providing entity, in the event that the current stock level $S(P_i)$ of that product $P_1, P_2, P_3, P_4$ falls below the minimum quantity $Q_m$. Thus, the method provides an automated way of controlling a product stock level under use of a determined safety stock level $s_i$.

The precision of the above described method can be improved by applying further exceptional rules. The value of 0 pieces of products $P_1, P_2, P_3, P_4$ demanded is insofar a special value since it is in some sense an insignificant value. This anomaly of selective significance can be taken into account by the following improvements:

The demand for 0 pieces of the products $P_1, P_2, P_3, P_4$ is assigned a separate bin.

In the normalization step 20 the demand value for 0 pieces of the products $P_1, P_2, P_3, P_4$ in the discrete demand densities $D_{P1d}, D_{P2d}, D_{P3d}, D_{P4d}$ is inversely rescaled with respect to the demand values for more than 0 pieces of the same product $P_1, P_2, P_3, P_4$. This can be done by determining the average zero-demand probability $p_{a0}$ for the demand for 0 pieces of a product $P_1, P_2, P_3, P_4$, over all products $P_1, P_2, P_3, P_4$, and determining the average non-zero-demand probability $p_{a1+}$ for the demand for more than 0 pieces of a product $P_1, P_2, P_3, P_4$, over all products $P_1, P_2, P_3, P_4$. Furthermore a relation level $l_r$ is defined that gives the desired relation between the average non-zero-demand probability $p_{a1+}$ and the average zero-demand probability $p_{a0}$. Then the rescaling is executed in that the demand values for 0 pieces of the products $P_1, P_2, P_3, P_4$ are each multiplied by a zero-demand rescaling factor which is the relation level $l_r$ divided by the average zero-demand probability $p_{a0}$, and the demand values for more than 0 pieces of the products $P_1, P_2, P_3, P_4$ are each multiplied by a non-zero-demand rescaling factor which is 1 minus the relation level $l_r$ divided by the average non-zero-demand probability $p_{a1+}$.

This rescaling has the effect that for slow-moving items the true demand occurrences are not outscaled and therefore reduced in their significance by the demand value for 0 pieces. Otherwise all slow-moving items would result to arrive in the same cluster $C_i$, although the density for more than 0 pieces may differ strongly. The rescaling allows to stress the significant values, i.e. those above 0 pieces. Although the demand value for 0 pieces is less significant, it should not be suppressed here, since a suppression would again distort the result of the clustering. In the case of suppression, slow-moving items would be clustered together with non-slow-moving items, which would also not be correct, and even within the class of slow-moving items there is a distance between "slow" and "very slow", i.e. the products $P_1, P_2, P_3, P_4$ with very few demand occurrences, e.g. 3 times in a year, and those with more, e.g. 20 times in a year. These distances shall not be neglected in the clustering step 30, hence the rescaling is seen as the appropriate measure. The rescaling hence results in a more accurate clustering in particular for the slow-moving items.

In the selection step 40 the demand value for 0 pieces of the products $P_1, P_2, P_3, P_4$ is suppressed. Again this is particularly useful because in comparison with the continuous model densities $D^m{}_{Mc}$ the value of 0 pieces would distort the assignment of the best fitting model density $D^m{}_{Mc}$. Now here a total suppression has no detrimental effect, since the clustering has already been done.

In the adjustment step 70 the demand value for 0 pieces of the products $P_1, P_2, P_3, P_4$ can be reused and rescaled. This achieves an undistorted equivalence between the original discrete demand densities $D_{P1d}, D_{P2d}, D_{P3d}, D_{P4d}$ and the final continuous demand densities $D_{P1c}, D_{P2c}, D_{P3c}, D_{P4c}$.

The described method can be executed on a computer that is equipped with a computer program that when executed carries out the steps of the method. More precisely the computer would be designed to comprise a processor for executing the different steps, a memory for at least intermediately storing the results of the different steps and the predetermined set $L_D$ of continuous model densities $D^m{}_{Mc}$. The computer could also comprise an input device for receiving from a user a desired value for the service level SL and/or the reordering quantity $Q_r$. The computer could furthermore be connected to a computer network and electronically effect the issuance of an order to a product provider for a specific product $P_1, P_2, P_3, P_4$ at a point in time when the current stock level $S_i$ of that product $P_1, P_2, P_3, P_4$ falls below the determined minimum quantity $Q_m$. The system can use a predetermined reordering quantity $Q_m$ herefor. In this sense the method would provide an automated solution for the problem of maintaining the stock of several products $P_1, P_2, P_3, P_4$ at a level that corresponds to a desired service level SL. The automatic order issuance can also be effected by controlling an output device of any kind, e.g. printer, plotter, telephone, fax machine, loudspeaker, display, etc. whose output is receivable by a product provider, e.g. issuing an automatic order printout that can be sent to the product provider, or issuing over a phone connection a voice message that is receivable at that product provider, creating an order e-mail that is automatically sent to the product provider, and the like. The computer could also instead of ordering directly such a product $P_1, P_2, P_3, P_4$, issue an alerting message to a stock controller who thereby has a stock level control system and can decide thereupon whether or how much of the respective product $P_1, P_2, P_3, P_4$ is to be ordered.

Figure 2:
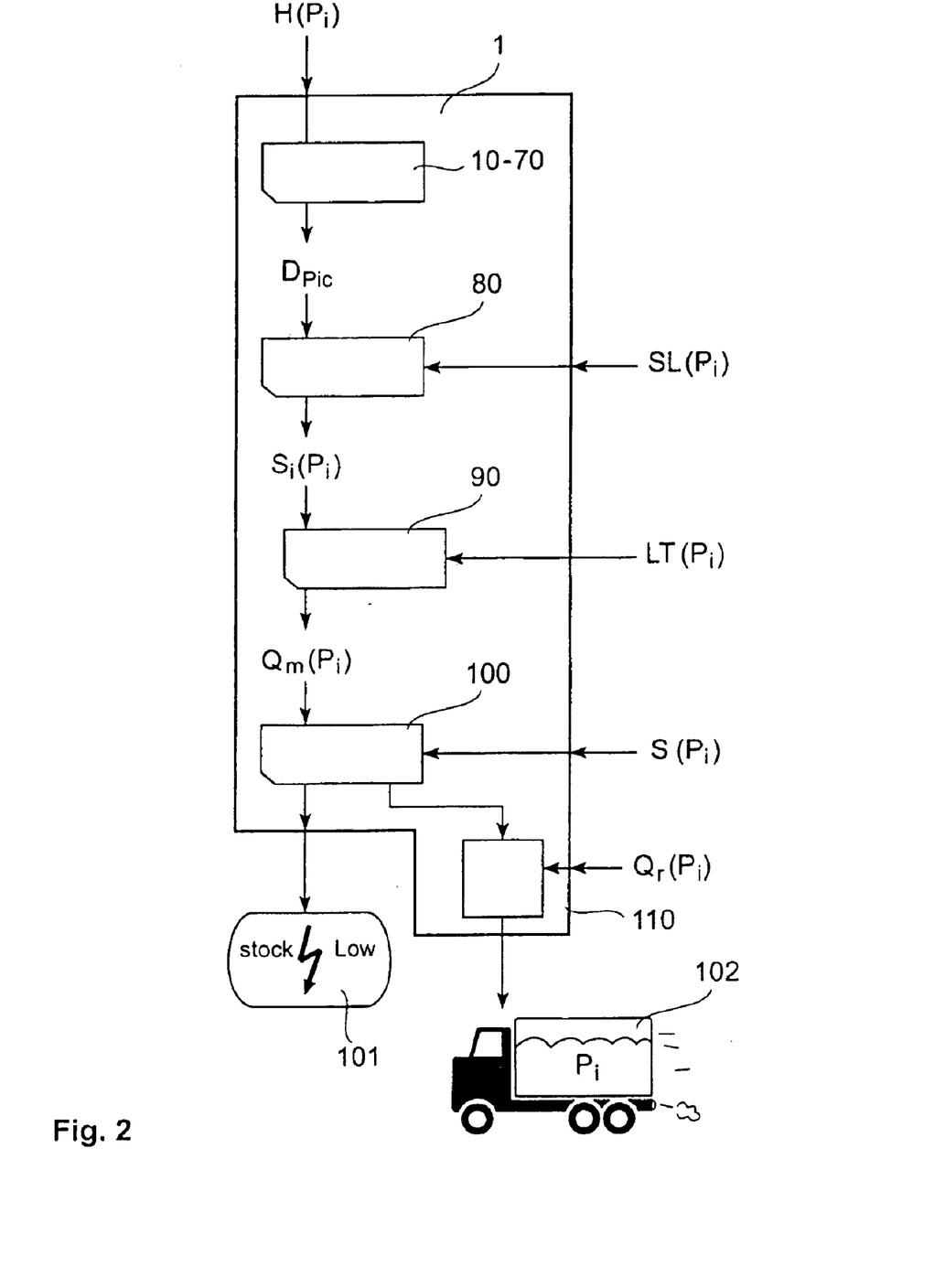
FIG. 2 a schematic view of a computer in which from given product-specific input parameters a stock-alert signal or an automatic product order are issued.

In FIG. 2 a product stock control system is depicted making use of the above described method. The system comprises a computer 1 that receives as input for each product $P_1, P_2, P_3, P_4$ its demand time series $H(P_1), H(P_2), H(P_3), H(P_4)$, its lead time $LT(P_1), LT(P_2), LT(P_3), LT(P_4)$, its reorder quantity $Q_r(P_1), Q_r(P_2), Q_r(P_3), Q_r(P_4)$ and the current stock level $S(P_1), S(P_2), S(P_3), S(P_4)$. It furthermore receives a service level, that can be a product-specific service level $SL(P_1), SL(P_2), SL(P_3), SL(P_4)$. The computer executes by means of its processor the stored computer program that performs the safety stock determination method, determining going e.g. through the conversion step 10, normalization step 20, clustering step 30, selection step 40, parameter selection step 50 and denormalization step 70 for each product $P_1, P_2, P_3, P_4$ the continuous demand density $D_{P1c}, D_{P2c}, D_{P3c}, D_{P4c}$ is determined. Then follows the safety stock determination step 80 in which for each product $P_1, P_2, P_3, P_4$ the safety stock level $s_i(P_1), s_i(P_2), s_i(P_3), s_i(P_4)$ is determined in dependence on the product-specific service level $SL(P_1), SL(P_2), SL(P_3), SL(P_4)$.

In a subsequent reorder-point determination step 90, i.e. the minimum quantity $Q_m(P_1), Q_m(P_2), Q_m(P_3), Q_m(P_4)$ is determined for each product $P_1, P_2, P_3, P_4$ under use of the lead times $LT(P_1), LT(P_2), LT(P_3), LT(P_4)$.

In a subsequent stock analysis step 100 under use of the current stock level $S(P_1), S(P_2), S(P_3), S(P_4)$ the computer 1 determines the current stock situation for each product $P_1$, $P_2$, $P_3$, $P_4$. As soon as the stock situation for at least one of the products $P_1$, $P_2$, $P_3$, $P_4$ becomes critical, i.e. the current stock level $S(P_1)$, $S(P_2)$, $S(P_3)$, $S(P_4)$ approaches the minimum quantity $Q_m(P_1)$, $Q_m(P_2)$, $Q_m(P_3)$, $Q_m(P_4)$ to a predetermined extent, e.g. becomes equal or lower than the minimum quantity $Q_m(P_1)$, $Q_m(P_2)$, $Q_m(P_3)$, $Q_m(P_4)$, the computer 1 will perform a stock control action for that product $P_1$, $P_2$, $P_3$, $P_4$. The stock control action can e.g. be a stock-alert signal 101 that is sent out via a computer output port. Another possibility for the stock control action is to perform a product order step 110 by initiating an automatic order 102 under use of the corresponding reorder quantity $Q_r(P_1)$, $Q_r(P_2)$, $Q_r(P_3)$, $Q_r(P_4)$.

It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments.

It is obvious that a person skilled in the art can modify the shown arrangements in many ways without departing from the gist of the invention which is encompassed by the subsequent claims.

What is claimed is:

1. Method for assigning to a set of products ($P_1$, $P_2$, $P_3$, $P_4$) a set of corresponding continuous demand densities ($D_{P1c}$, $D_{P2c}$, $D_{P3c}$, $D_{P4c}$) comprising the following steps:

a conversion step (10) wherein for each product ($P_1$, $P_2$, $P_3$, $P_4$) its demand time series ($H(P_1)$, $H(P_2)$, $H(P_3)$, $H(P_4)$) is converted into a discrete demand density ($D_{P1d}$, $D_{P2d}$, $D_{P3d}$, $D_{P4d}$), a normalization step (20) wherein said discrete demand densities ($D_{P1d}$, $D_{P2d}$, $D_{P3d}$, $D_{P4d}$) are transformed into normalized discrete demand densities ($D^N_{P1d}$, $D^N_{P2d}$, $D^N_{P3d}$, $D^N_{P4d}$), a clustering step (30) wherein each of said normalized discrete demand densities ($D^N_{P1d}$, $D^N_{P2d}$, $D^N_{P3d}$, $D^N_{P4d}$) is assigned to a cluster ($C_1$, $C_2$) and wherein for each said cluster ($C_1$, $C_2$) a cluster-representative discrete density ($R_{fC1}$, $R_{fC2}$) is determined, a selection step (40) wherein for each cluster-representative discrete density ($R_{fC}$) out of a predetermined set ($L_D$) of continuous model densities ($D^m_{Mc}$) a cluster-representative continuous density ($D^m_{Cc}$) is selected, a parameter-determination step (50) wherein for each product ($P_1$, $P_2$, $P_3$, $P_4$) for its cluster-representative continuous density ($D^m_{Cc}$) product-individual density parameters (p(P)) are determined under use of which for each product ($P_1$, $P_2$, $P_3$, $P_4$) a continuous density ($D^m_{P1c}$, $D^m_{P2c}$, $D^m_{P3c}$, $D^m_{P4c}$) is determined, a adjustment step (70) wherein for each product ($P_1$, $P_2$, $P_3$, $P_4$) average and variance of said continuous density ($D^m_{P1c}$, $D^m_{P2c}$, $D^m_{P3c}$, $D^m_{P4c}$) are adjusted to form said continuous demand density ($D_{P1c}$, $D_{P2c}$, $D_{P3c}$, $D_{P4c}$).

2. Method according to claim 1, further comprising a clustering correction step (60) wherein for each product ($P_1$, $P_2$, $P_3$, $P_4$) a distance ($d_p$) between its continuous density ($D^m_{P1c}$, $D^m_{P2c}$, $D^m_{P3c}$, $D^m_{P4c}$) and its normalized discrete demand density ($D^N_{P1d}$, $D^N_{P2d}$, $D^N_{P3d}$, $D^N_{P4d}$), is determined and wherein for those of said products ($P_1$, $P_2$, $P_3$, $P_4$) whose distance ($d_p$) exceeds a predetermined threshold value ($t_h$), in a substitute-selection step (63) for the corresponding normalized discrete demand density ($D^N_{P1d}$, $D^N_{P2d}$, $D^N_{P3d}$, $D^N_{P4d}$) out of said predetermined set ($L_D$) of continuous model densities ($D^m_{Mc}$) a substitute continuous density ($D^m_{P1cS}$, $D^m_{P2cS}$, $D^m_{P3cS}$, $D^m_{P4cS}$) is selected, which is defined for that product ($P_1$, $P_2$, $P_3$, $P_4$) as its continuous density ($D^m_{P1c}$, $D^m_{P2c}$, $D^m_{P3c}$, $D^m_{P4c}$).

3. Method according to claim 1, wherein in the conversion step (10) the demand time series is substantially segregated from demand trend and periodic demand.

4. Method according to claim 1, wherein in the normalization step (20) normalization information is maintained for the adjustment step (70).

5. Method according to claim 1, wherein in the clustering step (30) a said cluster representative ($X_1$, $X_2$) is substantially not modified when its distance ($d_C(X_i, D^N_{Pid})$) to those normalized discrete demand densities ($D^N_{P1d}$, $D^N_{P2d}$, $D^N_{P3d}$, $D^N_{P4d}$) that belong to the corresponding cluster ($C_1$, $C_2$), is below a predetermined value.

6. Method according to claim 1, wherein the predetermined set ($L_D$) of continuous model densities ($D^m_{Mc}$) contains the model densities ($D^m_{Mc}$) with its parameters (p) in an undetermined form and wherein the parameters (p) for the clusters ($C_1$, $C_2$) are determined in the selection step (40).

7. Method according to claim 1, wherein in the normalization step (20) the demand value for 0 pieces of the products ($P_1$, $P_2$, $P_3$, $P_4$) in the discrete demand densities ($D_{P1d}$, $D_{P2d}$, $D_{P3d}$, $D_{P4d}$) is rescaled inversely to the demand values for more than 0 pieces of the same product ($P_1$, $P_2$, $P_3$, $P_4$).

8. Method according to claim 1, wherein in the selection step (40) the demand value for 0 pieces of the products ($P_1$, $P_2$, $P_3$, $P_4$) is suppressed.

9. Method according to claim 1, further comprising a safety stock determination step (80) wherein with a given service level ($SL(P_1)$, $SL(P_2)$, $SL(P_3)$, $SL(P_4)$) from the continuous demand density ($D_{P1c}$, $D_{P2c}$, $D_{P3c}$, $D_{P4c}$) for one or more of the products ($P_1$, $P_2$, $P_3$, $P_4$) a product safety stock level ($s_t(P_1)$, $s_t(P_2)$, $s_t(P_3)$, $s_t(P_4)$) is determined.

10. Method according to claim 9, further comprising a product order step (110) wherein via an output device an order for a said product ($P_1$, $P_2$, $P_3$, $P_4$) is initiated towards a product-providing entity, in the event that a current stock level $S(P_1)$, $S(P_2)$, $S(P_3)$, $S(P_4)$ of that product ($P_1$, $P_2$, $P_3$, $P_4$) falls below a minimum quantity ($Q_m(P_1)$, $Q_m(P_2)$, $Q_m(P_3)$, $Q_m(P_4)$) that is the sum of the average of the discrete demand density ($D_{P1d}$, $D_{P2d}$, $D_{P3d}$, $D_{P4d}$) for said product ($P_1$, $P_2$, $P_3$, $P_4$) during the product's lead time ($LT(P_1)$, $LT(P_2)$, $LT(P_3)$, $LT(P_4)$), and the determined safety stock level ($s_t(P_1)$, $s_t(P_2)$, $s_t(P_3)$, $s_t(P_4)$) for said product ($P_1$, $P_2$, $P_3$, $P_4$).

11. Computer program product comprising program code means for performing a method according to claim 1.

12. Computer program product according to claim 11, comprising the program code means stored on a computer-readable medium.

13. Method according to claim 1, wherein for each of the clusters ($C_1$, $C_2$) an initial cluster representative ($X_1$, $X_2$) is provided, and wherein the clustering step (30) comprises for each of the normalized discrete demand densities ($D^N_{P1d}$, $D^N_{P2d}$, $D^N_{P3d}$, $D^N_{P4d}$)

a distance determination step wherein for each said initial cluster representative ($X_1$, $X_2$) its distance ($d_C(X_i, D^N_{Pid})$) from the normalized discrete demand density ($D^N_{Pid}$) is determined, and a modification step wherein the one initial cluster representative ($X_i$) is modified towards the normalized discrete demand density ($D^N_{Pid}$) to which it has the smallest distance ($d_C(X_i, D^N_{Pid})$), said modified cluster representative ($X_i$) being thereafter defined as new initial cluster representative ($X_i$).

14. Method according to claim 13, wherein the distance determination step and the modification step are repeated one or more times for each of the normalized discrete demand densities ($D^N_{P1d}$, $D^N_{P2d}$, $D^N_{P3d}$, $D^N_{P4d}$), starting with the initial cluster representatives ($X_1$, $X_2$) that are present after the previous last modification step.

15. Method according to claim 13, wherein the initial cluster representatives ($X_1$, $X_2$) that are present after the last modification step are selected in the clustering step (30) as the cluster-representative discrete density ($R_{fC}$).

* * * * *